United States Patent
Han et al.

(10) Patent No.: US 10,057,379 B2
(45) Date of Patent: Aug. 21, 2018

(54) SYSTEMS AND METHODS FOR DRILLING AUTOMATION WITH OPC UA

(71) Applicants: China Petroleum & Chemical Corporation, Beijing (CN); Sinopec Tech Houston, LLC., Houston, TX (US)

(72) Inventors: Jun Han, Houston, TX (US); Sheng Zhan, Houston, TX (US); Jinhai Zhao, Houston, TX (US); Weiping Xu, Houston, TX (US); Herong Zheng, Houston, TX (US)

(73) Assignees: CHINA PETROLEUM & CHEMICAL CORPORATION, Beijing (CN); SINOPEC TECH HOUSTON, LLC., Houston, TX (US)

( * ) Notice: Subject to any disclaimer, the term of this patent is extended or adjusted under 35 U.S.C. 154(b) by 0 days.

(21) Appl. No.: 14/939,642

(22) Filed: Nov. 12, 2015

(65) Prior Publication Data
US 2017/0142229 A1    May 18, 2017

(51) Int. Cl.
G01V 3/00 (2006.01)
H04L 29/06 (2006.01)
E21B 41/00 (2006.01)

(52) U.S. Cl.
CPC .............. H04L 67/42 (2013.01); E21B 41/00 (2013.01)

(58) Field of Classification Search
None
See application file for complete search history.

(56) References Cited

U.S. PATENT DOCUMENTS

| | | | |
|---|---|---|---|
| 7,467,018 B1 * | 12/2008 | Callaghan | G05B 19/4186 700/1 |
| 2006/0100797 A1 * | 5/2006 | Poorman | G01H 1/00 702/56 |
| 2009/0210814 A1 * | 8/2009 | Agrusa | G05B 23/0267 715/772 |
| 2016/0055737 A1 * | 2/2016 | Boken | F04B 49/10 340/679 |
| 2016/0127514 A1 * | 5/2016 | Maksumov | H04L 69/08 709/202 |
| 2016/0187508 A1 * | 6/2016 | Plost | G06Q 50/02 702/6 |

* cited by examiner

*Primary Examiner* — Brian Zimmerman
*Assistant Examiner* — Kevin Lau
(74) *Attorney, Agent, or Firm* — Novick, Kim & Lee, PLLC; Allen Xue

(57) ABSTRACT

The present disclosure provides a drilling system that comprises a drilling rig, a device box having a plurality of sensors monitoring operating parameters of the drilling rig, an OPC UA server receiving data from the plurality of the sensors, and an OPC UA client in communication with the OPC UA server. The OPC UA client has a client library between the client application layer and the client SDK layer, which converts a client application to an OPC UA operation.

6 Claims, 1 Drawing Sheet

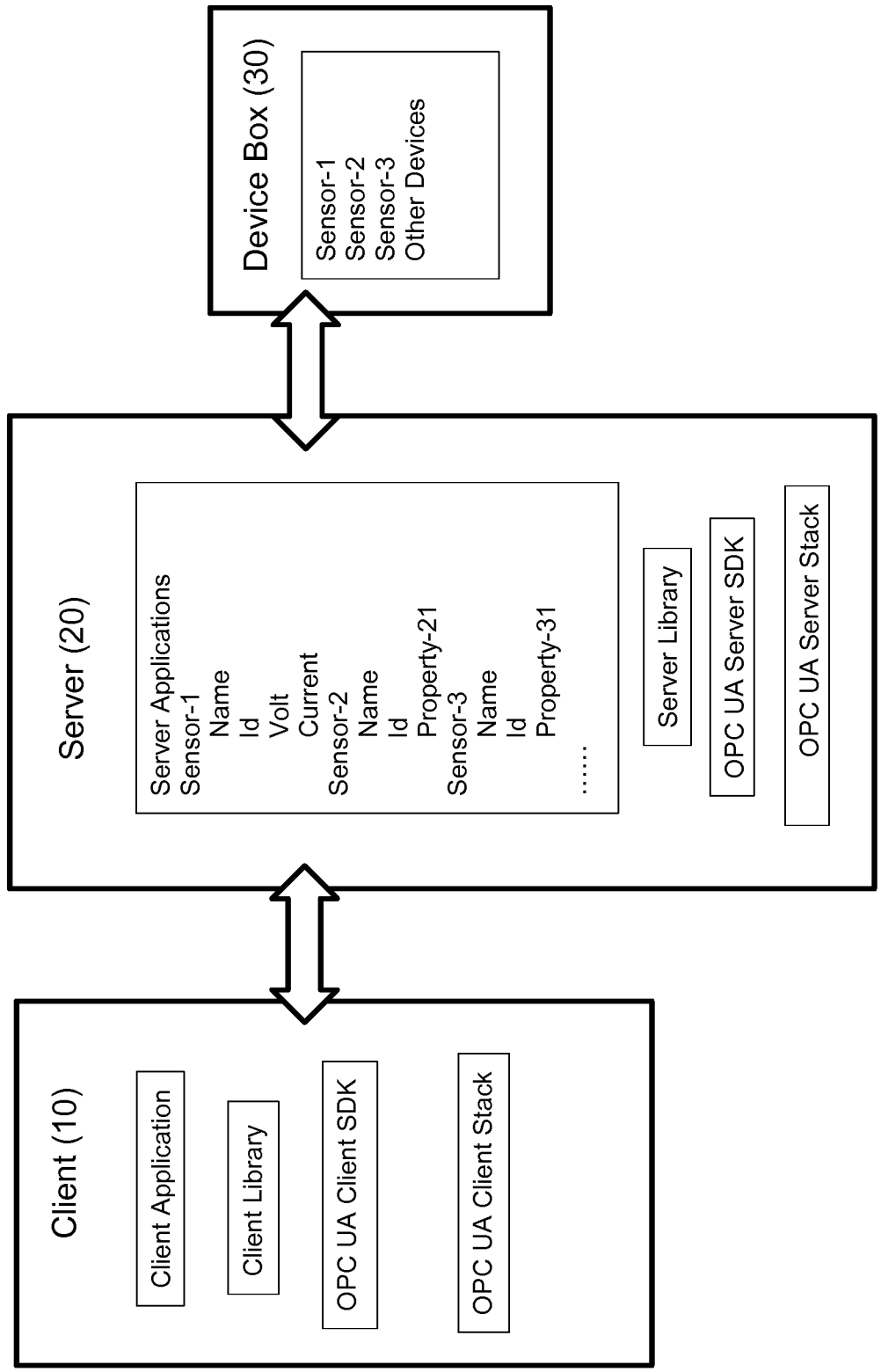

SYSTEMS AND METHODS FOR DRILLING AUTOMATION WITH OPC UA

TECHNICAL FIELD

The present disclosure relates to methods and devices for communication between clients and servers according to a standard protocol OPC UA. The methods and devices are suitable for communications in industrial automation systems, especially in the field of oil and gas explorations.

BACKGROUND

The drilling system used in the modern oil and gas explorations is a complex electro-mechanical systems. It includes both surface equipment and downhole drilling tools. Surface equipment includes rotating equipment for rotating downhole drilling tools, hoisting equipment for lifting the drill string, pipe handling systems for handling tubulars used in construction of the well, pressure control equipment for controlling wellbore pressure, mud pumps and mud cleaning equipment for handling the drilling mud.

Downhole drilling tools include a drilling assembly that breaks and traverses the earth formation. The drilling assembly includes a drill bit and a drill collar. It may also have a downhole motor, a rotary steerable system, telemetry transmitters, as well as measurement-while-drilling (MWD) and logging-while-drilling (LWD) instruments.

Sensors are employed to measure the operations of surface equipment (e.g., hook load, block height, rotary RPM) as well as conditions downhole, which include properties of the earth formation (e.g., resistivity, density, porosity, permeability, acoustic properties, nuclear-magnetic resonance properties, corrosive properties of the fluids or formation, and salt or saline contents) and operation parameters of the downhole tools. Parameters of the drilling assembly measured typically include velocity, vibration, bending moment, etc. Downhole vibrations can be further categorized into axial vibration (e.g., bit bounce), which is along the drill string axis; lateral vibration (e.g., whirl), which is transverse to the drill string axis; and torsional vibration (e.g., stick slip), which is in rotary path about the drill string axis. The MWD/LWD instruments also monitor drilling operating parameters including weight-on-bit (WOB), drilling mud flow rate, pressure, temperature, rate of penetration, azimuth, tool face, drill bit rotation, etc. A sensor, used herein, refers generally to a device that receives data indicating a condition downhole or above ground. For example, in mud-pulse telemetry, the sensor can be a pressure sensor that monitors the drilling fluid pressure fluctuations. In electromagnetic telemetry, the sensor can be a device detecting the voltage difference between the wellhead and the ground rod. In wired pipe telemetry, the sensor can be directly attached to a downhole tool and data collected therefrom is transmitted to the surface via cables.

The large amount of data gathered during the drilling operation presents challenges in data transmission and data sharing. For example, constructing a single well often involves the owner of the well, a drilling contractor who drillings the well, and many other companies that provide specialized tools and services (e.g., tripping the drilling string, casing, and sealing) for the construction as well as operation of the well. The different players often have their own proprietary systems and software. Integrating multiple systems from different companies are very complex.

Furthermore, for drilling automation, equipment on the rig communicates to and is controlled by a PLC (Programmable Logic Controller) on the drilling rig. PLCs on different rigs are often different so that automation designed for one rig may not be applicable to others.

OPC Unified Architecture (OPC UA) is a protocol for manufacturer-independent communication used in industrial automation system. An automation system may employ an OPC UA server that store information regarding the operational parameters of the system. In addition, the OPC UA server may also make the information available via a network connection to one or more OPC UA clients operating at other locations. As such, OPC UA provides a standard and secure bi-directional network protocol for device communications, e.g., it provides a standard and portable interface for data query and controlling devices. OPC UA can also be used in storing and providing historical data. It can further perform device discovery, allowing for plug-and-play of rig equipment.

Therefore, there is a need to facilitate the implementation of OPC UA in the drilling data communications, for example, to improve or upgrade existing application system with OPC UA.

SUMMARY

The present disclosure provides a drilling system that comprises a drilling rig, a device box having a plurality of sensors monitoring operating parameters of the drilling rig, an OPC UA server receiving data from the plurality of the sensors, and an OPC UA client in communication with the OPC UA server. The OPC UA client has a client library between the client application layer and the client SDK layer, which converts a client application to an OPC UA operation.

In another embodiment, the OPC UA server has a server library between the server application layer and the server SDK layer, which converts a server application to an OPC UA operation.

The disclosure also provides a method to convert an existing drilling system not using OPC UA protocol by replacing the communication layer in the existing system with such a library.

BRIEF DESCRIPTION OF THE DRAWINGS

The teachings of the present invention can be readily understood by considering the following detailed description in conjunction with the accompanying drawing.

FIG. 1 shows a schematic diagram of the OPC UA server—client structure of the current disclosure.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Reference will now be made in detail to embodiments of the present disclosure, examples of which are illustrated in the accompanying drawings. It is noted that wherever practicable, similar or like reference numbers may be used in the drawings and may indicate similar or like elements.

The drawings depict embodiments of the present disclosure for purposes of illustration only. One skilled in the art would readily recognize from the following description that alternative embodiments exist without departing from the general principles of the present disclosure.

FIG. 1 is a schematic illustration of a system of the current disclosure. The system contains an OPC UA client (10), an OPC UA server (20), and a device box (30). The OPC UA client (10) can be a device with an OPC UA client stack, SDK, a library and application, such as, HMI or PC. The OPC UA server (20) contains server stack, SDK, and applications. The client and server communicate via a secure channel (40). The transport protocol can be different combinations of UA Binary, TCP/IP, HTTPS, SOAP, etc. The device box (30) can be a hardware device equipped with sensors. The OPC UA server can be stand alone or directly embedded with the hardware in the device box.

In FIG. 1, the device box (30) contains a plurality of sensors that collect information from various devices on the rig. The device box (30) communicates with the OPC UA server (20) via Ethernet or a serial connection. Alternatively, in another embodiment, the OPC UA server (20) can be embedded with the device box (30)

OPC UA application development is based on a layered structure. At the bottom of the layers is the OPC UA stack, which implements the TCP/IP communication protocol defined by the OPC Foundation. The OPC UA stack can be an AnsiC Stack, a .NET Stack, or a Java Stack, depending on the development language and environments. Different OPC UA stacks are independent of the development environment in which they are created. Therefore, OPC UA applications developed by different parties using different tools can work together. An OPC UA stack handles communication protocols, typically involving low level APIs that fulfill functions such as message encoding, message security, message transport, etc.

The OPC UA SDK is built on top of the OPC UA stack to implement base services, including current values, information models, events, node management, alarms, subscription management, history, session management, methods, identity managements, etc.

As shown in FIG. 1, both the OPC UA client (10) and the OPC UA server (20) contain a stack layer and a SDK layer. The server applications in the server are supported/developed directly on the server SDK layer. In this case, the applications show the parameters of a sensor (sensor1-3), which include name, ID, voltage, and current, or other properties (property-21 or property-31). Additional sensors or devices as well as operating parameters can be added. On the other hand, the OPC UA client (10) contains a library between client applications and the OPC UA client SDKs. The library contains an adapter interface, which converts a client application to an OPC UA operation. The inclusion of this library enables developers who has limited or no knowledge about OPC UA to write applications in languages that they are familiar with. The applications written that can be used in the OPC UA system.

Specifically, during implementation, the OPC UA client detects nodes in the OPC UA server and maps a server address space. It provides an interface of device-item (such as a sensors) tree to a client application. It also converts each operation from a client application to OPC UA operation, as well as any alarm or event from server to a client event to forward to the client application.

A server library can be provided in the OPC UA server between the server application layer and the server SDK. The server library contains an adapter interface, which converts a server application to an OPC UA operation. The inclusion of this library enables developers who has limited or no knowledge about OPC UA to write applications in languages that they are familiar with. The applications written that can be used in the OPC UA system.

In other embodiments, the OPC UA client has the client library with the OPC UA server does not have the server library, and vice versa.

The inclusion of a library in the OPC UA server and/or the OPC UA client can replace the communication layer in an existing non-OPC UA application. It can support any client for an OPC UA server, and vice versa.

What is claimed is:

1. A drilling system, comprising:
   a drilling rig;
   a device box having a plurality of sensors monitoring operating parameters of the drilling rig;
   an OPC UA (OPC Unified Architecture) server receiving data from the plurality of the sensors; and
   an OPC UA client in communication with the OPC UA server,
   wherein the OPC UA client comprises a client application layer, a client SDK (Software Development Kit) layer, a client OPC UA stack, and a client library in communication with the client application layer and the client SDK layer, and wherein at least one of the plurality of the sensors monitors a downhole condition,
   wherein the OPC UA server is embedded in the plurality of sensors in the device box, and
   wherein the downhole condition is a rate of penetration of a drill bit, a weight-on-bit of the drill bit, or a tool face, and
   wherein the OPC UA server comprises a server application layer, a server SDK layer, a server OPC UA stack, and a server library in communication with the server application layer and the server SDK layer, the server library comprises a second adapter interface that converts a server application to an OPC UA operation.

2. The drilling system of claim 1, wherein the client application layer comprises one or more client applications written in a plurality of programing languages.

3. The drilling system of claim 2, wherein the client library comprises a first adapter interface that converts an operation from a client application to a client OPC UA operation.

4. The drilling system of claim 3, wherein the client application shows parameters from one of the plurality of sensors.

5. The drilling system of claim 4, wherein parameters comprises a name, an ID, a voltage, or a current.

6. The drilling system of claim 1, wherein the server application shows name, ID, voltage, and current of the plurality of sensors.

* * * * *